United States Patent

[11] 3,524,411

[72] Inventor  Jack Rooklyn
            Northridge, California
[21] Appl. No. 772,260
[22] Filed    Oct. 31, 1968
[45] Patented Aug. 18, 1970
[73] Assignee Republic Corporation
            Beverly Hills, California
            a Corp. of California

[54] VEHICLE SHUNTING APPARATUS
     9 Claims, 5 Drawing Figs.
[52] U.S. Cl. .................................................. 104/130,
                                           246/415, 246/416
[51] Int. Cl. ....................................................... E01b 25/06,
                                           E01b 25/12, E01b 25/20
[50] Field of Search ............................................ 104/130,
                                       25; 246/415, 416, 465

[56]            References Cited
            UNITED STATES PATENTS
3,348,497  10/1967  Mattsson ..................... 104/130
3,356,039  12/1967  Fonden et al. ................ 104/130

Primary Examiner— George T. Hall
Attorney— Lindenberg and Freilich

ABSTRACT: Apparatus for use with a transportation system that employs vehicles for carrying small goods in a factory, to shunt the vehicles between a siding and either of two main tracks. The apparatus comprises a laterally movable carriage with three short track sections, for repositioning each track section from alignment with a main track to alignment to another main track or with the siding.

Patented Aug. 18, 1970

JACK ROOKLYN
INVENTOR.

BY
Lindenberg & Freilich
ATTORNEYS

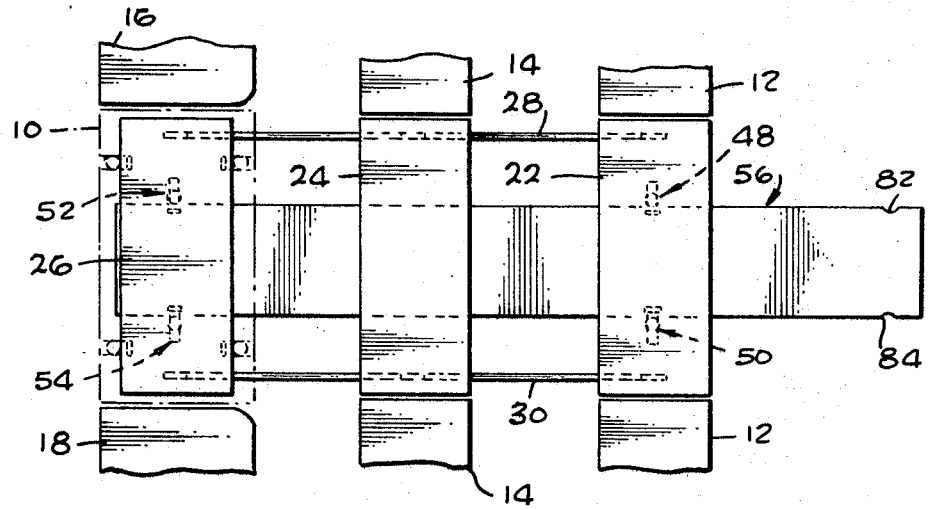
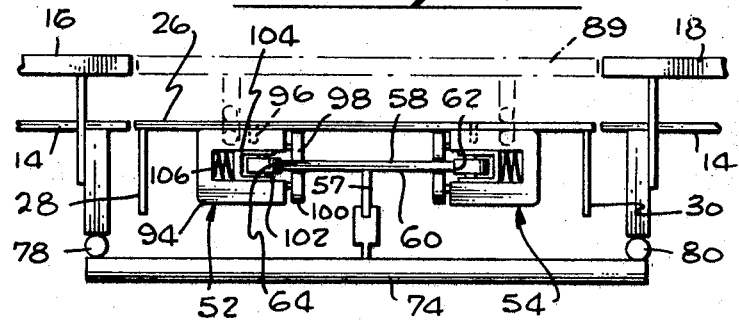
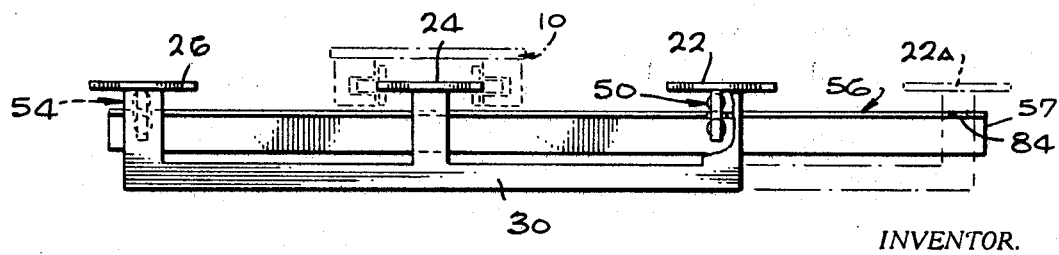

VEHICLE SHUNTING APPARATUS

BACKGROUND OF THE INVENTION

1. Field of the Invention

This invention relates to transportation systems, and more particularly to switching apparatus therefor.

2. Description of the Prior Art

One type of track-guided vehicle for carrying small parts in a manufacturing plant is described in patent application Ser. No. 754,412, filed Aug. 21, 1968, by Jack Rooklyn, assigned to the same assignee as the present application, and hereby incorporated by reference. That application describes a vehicle which rolls along a bandlike track, the vehicle having wheels which can bear on the upper and lower surfaces of the track and against the opposite sides of it to prevent derailment. Because of this resistance to derailment, it is difficult to provide simple means for switching a vehicle from one track to another, or from a siding position to a main track.

OBJECTS AND SUMMARY OF THE INVENTION

An object of the present invention is to provide simple and reliable shunting apparatus for use in a track transportation system.

Another object is to provide a shunt for use with a vehicle of the type that engages the upper and lower surfaces and edges of a track.

In accordance with the present invention, shunting apparatus is provided for a track-supported vehicle which is designed to engage many surfaces of a track. The apparatus comprises a carriage with a short shunt track section. The carriage is movable laterally to bring the shunt track section into alignment with either of two main tracks, or from a position of alignment with a main track to a siding position.

In one embodiment of the invention, a carriage is provided with three shunt track sections, for moving vehicles between either of two main tracks, or from a main track to a siding position. The main and shunt tracks have a band form with a long rectangular cross-section, for supporting a vehicle that engages the upper and lower faces and opposite edges of the track. The carriage moves along a laterally-extending carriage track which is of the same shape as the main and shunt tracks. The carriage engages the carriage track with wheel assemblies similar to those on the vehicles, which engage the upper and lower faces and the opposite edges of a track.

The novel features of the invention are set forth with particularity in the appended claims. The invention will be best understood from the following description when read in conjunction with the accompanying drawings.

BRIEF DESCRIPTION OF THE DRAWINGS

FIGURE 3 is a plan view of the apparatus of FIGURE 1;

FIGURE 4 is a side elevation view taken on the line 4-4 of FIGURE 1; and

FIGURE 5 is a view taken on the line 5-5 of FIGURE 1.

DESCRIPTION OF THE PREFERRED EMBODIMENTS

Figure 1:
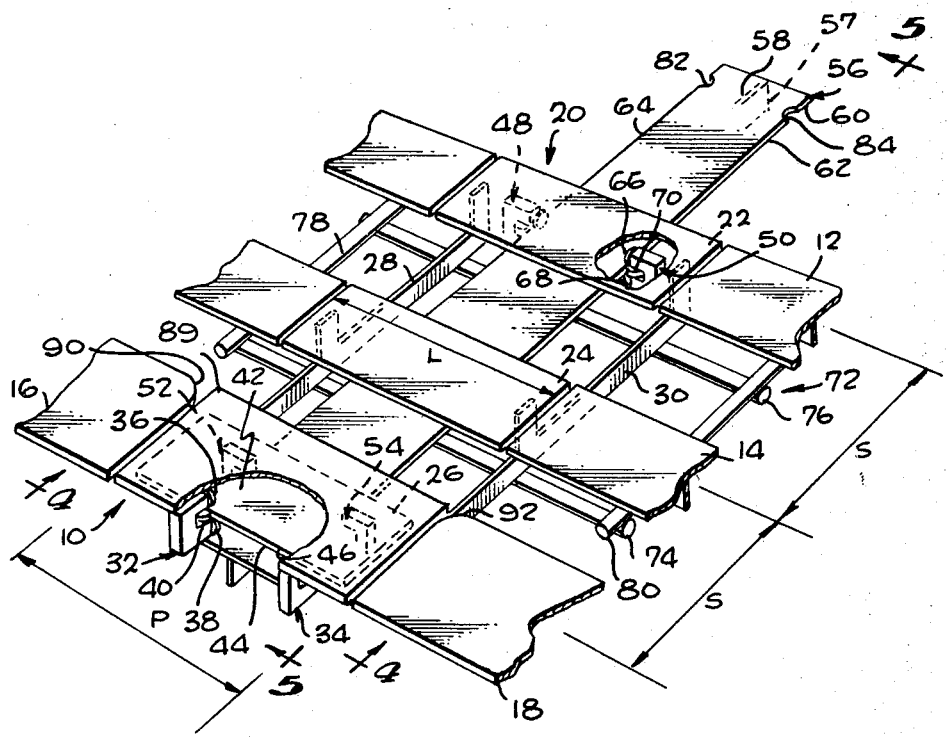
FIGURE 1 is a perspective view of shunt apparatus constructed in accordance with the invention.

FIGURE 1 illustrates shunting apparatus for moving a vehicle 10 from a first main track 12 to a second main track 14, or from the second main track to a siding position where the vehicle is in line with siding tables 16 and 18. The apparatus comprises a carriage 20 with three shunt track sections 22, 24 and 26 connected together by a pair of support means in the form of bars 28 and 30. The main tracks and shunt track sections are all in the form of a band, with a cross-section in the form of a long rectangle.

The vehicle 10 which moves along the tracks is supported thereon by two undercarriages or bogies 32 and 34. Each bogie includes a group of three wheels at opposite sides of the track for engaging the upper and lower track surfaces and one edge. For example, bogie 32 includes three wheels 36, 38 and 40 that engage the upper surface 42, lower surface 44, and one edge 46 of the shunt track section 26. This manner of track engagement prevents accidental tipping of the vehicle or removal from the track, but could also hamper the transfer of a vehicle from one main track to another or between a siding and main track. However, the shunting apparatus of the invention facilitates such transfers.

The three shunt track sections 22, 24 and 26 and connecting bars 28 and 30 are supported on four shunt bogies 48, 50, 52 and 54, each of which has three wheels. The track section 22 rests directly on the shunt bogies 48 and 50 while the section 26 rests on the bogies 52 and 54. The shunt bogies roll along a carriage track 56 which extends laterally across the main tracks 12 and 14 and the siding position. The carriage track 56 has the same shape as the main and shunt tracks, with upper and lower surfaces 58 and 60 and opposite side edges 62 and 64. Each shunt bogie, such as bogie 50 has three wheels 66, 68 and 70 that engage the upper and lower surfaces and one edge of the carriage track, in the same manner as the wheels of the vehicle 10 engage the main and shunt tracks.

An underlying support structure 72 includes a pair of tubes 74 and 76 that support the carriage track 56. The carriage track has a central flange 57 for added strength, which also supports it on the tubes 74 and 76. Another pair of tubes 78 and 80 support the ends of the main tracks 12 and 14. The tubes 78 and 80 are held by the tubes 74 and 76. Columns (not shown) support the tubes 74 and 76 a couple of feet above the ground.

Figure 2:
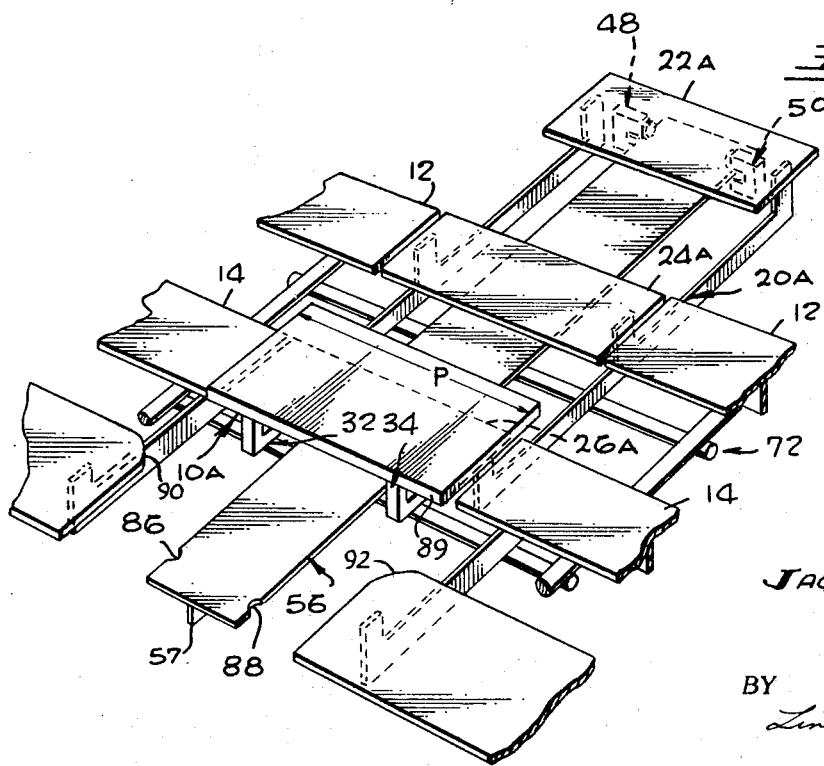
FIGURE 2 is a perspective view similar to that of FIGURE 1, but wherein the carriage is in a second lateral position.

The shunting of vehicles is accomplished by moving the carriage 20 laterally by a distance S equal to the spacing between the tracks 12 and 14, which is also equal to the space between second track 14 and the siding position. When the carriage is shifted from the position 20 of FIGURE 1 to the position 20A of FIGURE 2, the shunt track section 26 and vehicle 10 engaged therewith are moved from the siding position to positions 26A and 10A in line with the main track 14. The vehicle 10A can then be moved along the main track 14.

The shifting of vehicles also can be made from the first main track 12 to the second 14. This is accomplished by moving a vehicle onto shunt track section 24A when it is aligned with the first track 12 as in FIGURE 2. The carriage 20 is then shifted back to the position of FIGURE 1, so that the vehicle on track section 24 is in line with the main track 14. Further shifting of the vehicle to the siding is accomplished by rolling the vehicle off from section 24 onto the main track 14, then reshifting the carriage to position 20A of FIGURE 2, then rolling the vehicle onto section 26A, and then shifting the carriage to position 20 of FIGURE 1. The shunting apparatus can also be used to move a new vehicle into the track system, by rolling the vehicle onto the shunt track section 22A when it is in the position of FIGURE 2, and then shifting the carriage to the position of FIGURE 1.

The gap in the main tracks 12 and 14 are only slightly greater than the length L of the three shunt track sections 22, 24 and 26, to provide clearance therewith. This provides only a minute open space that enables the vehicles to move smoothly along the main tracks across the shunt track sections. The provisions of three shunt track sections, as shown, assures that there is always a continuous vehicle path in line with the main tracks 12 and 14, for either position of the carriage 20. This prevents a vehicle that is passing along the tracks, from accidentally falling off through a gap if the carriage is left in the wrong one of its two positions.

In order to latch or stop the carriage in the two positions 20 and 20A, wherein the shunt track sections are accurately aligned with the main tracks, latches or carriage stops are provided. The stops are in the form of indentations 82, 84, 86 and 88 formed in the carriage track, for receiving the side wheels of the carriage bogies 48, 50, 52 and 54.

The vehicles 10 each have an upper platform 89 which can hold small goods that are being worked upon in a manufacturing plant. The siding tables 16 and 18 have upper surfaces at the same height as the vehicle platform 89. Thus, when the vehicle is in the siding position of FIGURE 1, an item thereon can be handled as though it were a part of the siding table, and can be shifted thereon and back to the vehicle with little effort. The gap between the siding tables 16 and 18 can be made only slightly greater than the length P of the vehicle platforms.

In order to facilitate movement of the vehicles into a position between the siding tables, the tables have sloping edges at 90 and 92. These are provided because when a vehicle is moved from the second track 14 to the siding position, it may not be in the middle of the shunt track section 26. The sloping edges 90 and 92 of the tables will move the vehicle to the middle position to fit between tables.

FIGURES 4 and 5 show details of the carriage bogies. The bogie 52 has a frame 94 whose upper surface is fastened by bolts 96 to the shunt track section 26. The frame 94 carries three wheels 90, 100 and 102 that engage the upper and lower faces 58 and 60, and the side 64 of the carriage track. The side wheel 102 is held in a bracket 104 that is biased by a spring 106 toward the carriage track to promote smooth carriage movement without sideward "play" or looseness. The spring biasing also causes the side wheels to move into the indentations in the carriage track, to hold the carriage firmly in its two lateral positions, as described above. The bottom wheel 100 is normally spaced slightly from the lower surface of the carriage track, so that it does not contact the surface unless the carriage is lifted. Therefore, a slider element can generally be used instead of a wheel without adversely affecting performance. In order to reduce noise, the wheels may be provided with rubber or other elastomeric outer surfaces.

The other three bogies 48, 50 and 54 of the carriage are constructed in a manner similar to that of bogie 52, which is also similar to the construction of each half of the vehicle bogies. The sizes of the carriage track and the main and shunt tracks can be made equal, and the sizes of the wheels used on the carriage and vehicle bogies can be made equal, so that a minimum number of different size parts are utilized in the system. The track systems can be utilized with a power driven system, such as one wherein a driven cable extending parallel to the main tracks at a position beneath them, carries arms that engage vehicles to move them along the tracks.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. Apparatus for shunting vehicles to and from a main track with a gap therein comprising:
    a carriage;
    a shunt track section with a length substantially equal to said gap in said main track, said track section mounted on said carriage;
    means for guiding said carriage in substantially lateral movement between a position wherein said shunt track section is in said gap and aligned with said main track and a position laterally spaced therefrom; and
    stop means for holding said carriage in said position wherein said shunt track section is aligned with said main track.

2. The apparatus described in Claim 1 wherein:
    said means for guiding said carriage comprises a carriage track having upper and lower surfaces and opposite side edges, and a plurality of bogies mounted on said carriage, each having wheels engaging said upper surface and said opposite side edges of said carriage track and an element for engaging the lower surface of said carriage track.

3. The apparatus described in Claim 2 wherein:
    said stop means comprises an indentation in a side edge of said carriage track for receiving a wheel of one of said bogies.

4. Apparatus for shunting a vehicle between a siding position and a main track which has a gap therein comprising:
    a carriage assembly including first and second shunt track sections, each track section having a length slightly less than the length of said gap in said main track, and including support means for holding said shunt track sections at a predetermined lateral spacing;
    a carriage track extending in a substantially lateral direction with respect to said main track;
    means for guiding said carriage in movement along said carriage track between first and second positions wherein said first and second shunt track sections, respectively, are aligned with said main track; and
    means for latching said carriage in said first and second positions.

5. The apparatus described in Claim 4 wherein:
    said vehicle has a platform surface at a predetermined height above the level of said main track; and including work table means having a work surface at substantially the same level as the first level of said vehicle platform surface, said work table positioned to lie adjacent to said vehicle platform surface when said vehicle is in said siding position.

6. The apparatus described in Claim 4 wherein:
    said carriage track comprises a member having a band-like track portion with upper and lower surfaces and opposite side edges; and
    said means for guiding said carriage comprises a plurality of bogies, each having wheels engaged with said upper surface and one side edge of said carriage track and an element for engaging said lower surface of said carriage track.

7. The apparatus described in Claim 4 wherein:
    said main track, shunt track sections, and carriage track each have track portions in the form of long rectangles, with upper and lower surfaces and opposite side edges;
    said vehicle includes a plurality of bogies, each bogie having wheels for rolling on said upper and lower surfaces and at least one of said side edges of said main track and said shunt track sections; and
    said means for guiding said carriage comprises a plurality of bogies, each bogie having wheels for rolling on said upper and lower surfaces and at least one of said side edges of said carriage track.

8. Shunt apparatus for shunting a vehicle between first and second main tracks that have gaps of a predetermined length and which are spaced laterally from each other by a predetermined lateral distance, comprising:
    a carriage having first, second, and third shunt track sections, each substantially as long as said predetermined length of said gaps in said main tracks, said shunt track sections laterally spaced by said predetermined lateral distance of said main tracks;
    means for guiding said carriage laterally between a first position wherein said first and second shunt track sections are in line with said first and second main tracks, respectively, and a second position wherein said second and third shunt track sections are aligned with said first and second main tracks, respectively; and
    means for selectively retaining said carriage in said first and second positions, whereby to provide continuous vehicle paths in line with said main tracks for either position of said carriage.

9. The shunt apparatus described in Claim 8 wherein:
    said vehicle has a platform with a surface at a predetermined height above the level of said track and of predetermined platform length; and including
    siding work table means with a gap slightly greater than said predetermined platform length of said work table means, said work table means having sloping edge means for shifting said vehicle along a shunt track section so its platform enters said gap in said work table means.